United States Patent
Romanin

(10) Patent No.: US 7,384,249 B2
(45) Date of Patent: Jun. 10, 2008

(54) FLUID METERING SYSTEM

(75) Inventor: Mario Romanin, Valley City, OH (US)

(73) Assignee: Nordson Corporation, Westlake, OH (US)

( * ) Notice: Subject to any disclaimer, the term of this patent is extended or adjusted under 35 U.S.C. 154(b) by 487 days.

(21) Appl. No.: 10/906,640

(22) Filed: Feb. 28, 2005

(65) Prior Publication Data

US 2006/0191961 A1 Aug. 31, 2006

(51) Int. Cl.
F04B 35/00 (2006.01)
F04B 19/02 (2006.01)
F04B 27/06 (2006.01)
F16J 1/04 (2006.01)

(52) U.S. Cl. ............... 417/469; 417/404; 417/461; 417/491; 417/492; 417/53; 92/233

(58) Field of Classification Search ............ 417/461, 417/469, 491, 492, 534, 53, 403, 404; 92/233
See application file for complete search history.

(56) References Cited

U.S. PATENT DOCUMENTS

| 3,930,762 | A | * | 1/1976 | Varga | 417/492 |
| 4,491,248 | A | | 1/1985 | Blackwell | 222/249 |
| 4,773,565 | A | | 9/1988 | Rohlfing et al. | 222/145 |
| 5,368,195 | A | | 11/1994 | Pleet et al. | 222/52 |
| 5,456,298 | A | | 10/1995 | Tennis | 141/156 |
| 5,547,110 | A | | 8/1996 | Keller et al. | 222/219 |
| 6,059,148 | A | | 5/2000 | Keller et al. | 222/219 |
| 6,155,806 | A | | 12/2000 | Andel | 417/523 |

(Continued)

FOREIGN PATENT DOCUMENTS

EP 093372 A1 11/1983

(Continued)

OTHER PUBLICATIONS

Nordson Corporation, *Ejector Gun for Droplet Dispensing*, Brochure, 2001, 2 pgs.

(Continued)

*Primary Examiner*—Charles G Freay
(74) *Attorney, Agent, or Firm*—Wood, Herron & Evans, L.L.P.

(57) ABSTRACT

A fluid metering system includes a housing having a piston chamber with first and second spaced ends, at least one housing inlet passage, and at least one housing outlet passage. The housing inlet and housing passages communicate with the piston chamber. A piston is disposed in the piston chamber for reciprocal movement between the first and second ends of the piston chamber to alternatingly define first and second volumes therein. At least one first slot, and at least one second slot are formed on the outer surface of the piston, and extend from respective ends of the piston toward the respectively opposite ends. The first slot has an opening that is in communication with the first volume, and the second slot has an opening in communication with the second volume. The piston is rotatable within the piston chamber to alternatingly bring one of the first or second slots in registration with the housing inlet passage, while simultaneously bringing the other of the first or second slots in registration with the housing outlet passage. As the piston reciprocates between the first and second ends of the chamber, fluid is alternatingly dispensed from the first and second volumes.

12 Claims, 5 Drawing Sheets

U.S. PATENT DOCUMENTS

| | | | |
|---|---|---|---|
| 6,676,387 B1 | 1/2004 | Penn | 417/403 |
| 2004/0101426 A1 | 5/2004 | Wahlberg | |
| 2004/0256422 A1 | 12/2004 | Penn | |

FOREIGN PATENT DOCUMENTS

| | | |
|---|---|---|
| GB | 2059919 A | 4/1981 |
| GB | 2359860 A | 9/2001 |
| WO | 9614510 A1 | 5/1996 |

OTHER PUBLICATIONS

European Patent Office, International Search Report and Written Opinion from Corresponding PCT Application Serial No. PCT/US2006/002490, Jun. 28, 2006.

European Patent Office, International Preliminary Report on Patentability in PCT Application No. PCT/US2006/002490, May 24, 2007.

* cited by examiner

FLUID METERING SYSTEM

FIELD OF THE INVENTION

The present invention relates generally to fluid metering systems, and more particularly to a fluid metering system utilizing a reciprocating piston.

BACKGROUND OF THE INVENTION

Frequently, it is desired to dispense fluids in discreet, controlled volumes of adhesive to join two or more components of an assembled article. In such applications, the adhesive may be dispensed as discreet shots, dots, or beads of a precise volume of adhesive. Controlled volume dispensing or metering is particularly useful when the dispensed fluid is expensive, or when it is necessary to precisely mix two or more different fluids, such as multi-component adhesives.

Prior fluid metering systems have utilized reciprocating pistons to meter the volume of fluid dispensed. These systems typically utilize air or hydraulic pressure to actuate the piston between fill and dispense directions. Moreover, conventional piston metering systems typically dispense a single shot of fluid per cycle of piston reciprocation, thereby limiting the speed at which the fluid can be dispensed to the reciprocating speed of the piston. While these prior dispensing systems are suitable for certain applications, a need exists for an improved metering system which provides increased dispense rates and simplified construction.

SUMMARY OF THE INVENTION

The present invention provides a fluid metering system that is capable of dispensing discrete, controlled volumes of fluid, such as adhesive, at a rate of twice per cycle of piston reciprocation. Moreover, the piston of the present invention is actuated for reciprocation by the pressure of the dispensed fluid, thereby eliminating the need for a separate piston actuation device.

In one embodiment, the fluid metering system includes a housing having a piston chamber with first and second spaced ends, at least one housing inlet passage, and at least one housing outlet passage. The housing inlet and outlet passages communicate with the piston chamber. A piston is disposed in the piston chamber for reciprocal movement between the first and second ends of the piston chamber to alternatingly define first and second volumes therein. At least one first slot, groove, channel, etc., and at least one second slot, groove, channel, etc., are formed on the outer surface of the piston, and extend from respective ends of the piston toward the respectively opposite ends. The first slot has an opening that is in communication with the first volume, and the second slot has an opening in communication with the second volume. The piston is rotatable within the piston chamber to alternatingly bring one of the first or second slots in registration with the housing inlet passage, while simultaneously bringing the other of the first or second slots in registration with the housing outlet passage. As the piston reciprocates between the first and second ends of the chamber, fluid is dispensed from one of the first and second volumes.

In another aspect of the invention, the housing inlet passage is in communication with a source of pressurized fluid, and the pressurized fluid acts on the piston through one of the first or second slots to actuate the piston for reciprocating movement. In another embodiment, one of the first or second volumes is filled with fluid as the piston reciprocates to dispense fluid from the other of the first or second volumes.

In yet another aspect of the invention, the system further includes a rotary actuator operatively coupled to the piston and configured to rotate the piston such that one of the first or second slots is registered with the housing inlet passage, while the other of the first or second slots is registered with the housing outlet passage. In another embodiment, the rotary actuator rotates the piston when the piston is at one of the first or second ends of the piston chamber.

In yet another aspect of the invention, the piston is coupled to the rotary actuator by a piston rod extending from one end of the piston. A compensator rod extends from the opposite end of the piston and is sized to be substantially similar to the piston rod such that the maximum values of the first and second volumes are substantially equal. In another aspect of the invention, the fluid metering system includes a limit stop that extends into the piston chamber and has a length that is selectively adjustable to limit the reciprocating movement of the piston. In this manner, the volume of fluid dispensed during each stroke of the piston may be selectively adjusted by adjusting the length of the limit stop.

In yet another aspect of the invention, a method for dispensing fluid from a fluid dispensing system having a piston chamber, inlet and outlet passages communicating with the piston chamber, and a piston disposed in the piston chamber for reciprocating movement therein comprises reciprocating the piston in a first direction to fill a first volume with fluid through the inlet passage, indexing the piston to place the first volume in communication with the outlet passage and to place a second volume in communication with the inlet passage, and reciprocating the piston in a second direction to dispense fluid from the first volume through the outlet, while simultaneously filling the second volume with fluid through the inlet.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
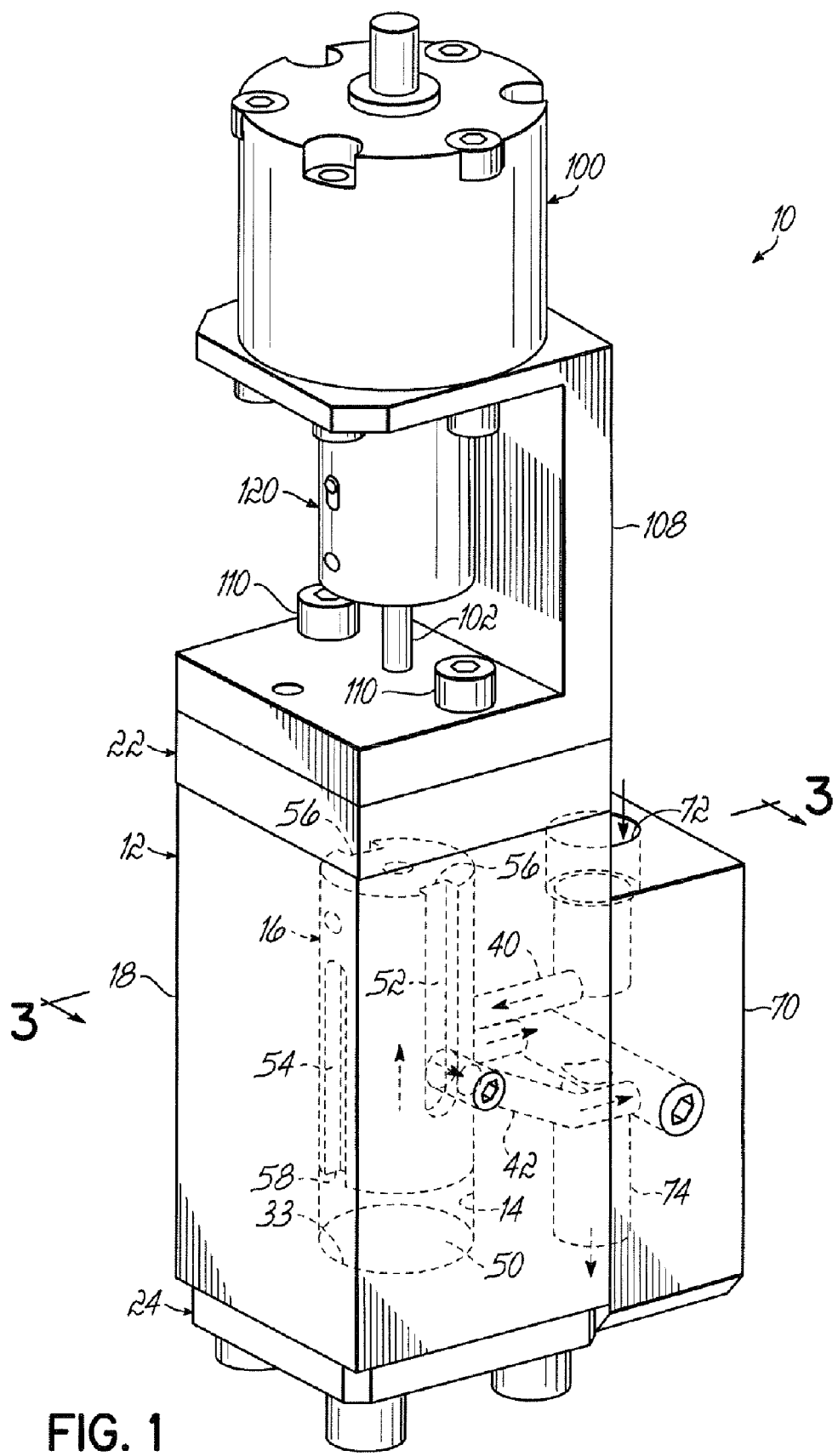
FIG. 1 is a perspective view of an exemplary fluid metering system according to the present invention.
Figure 2:
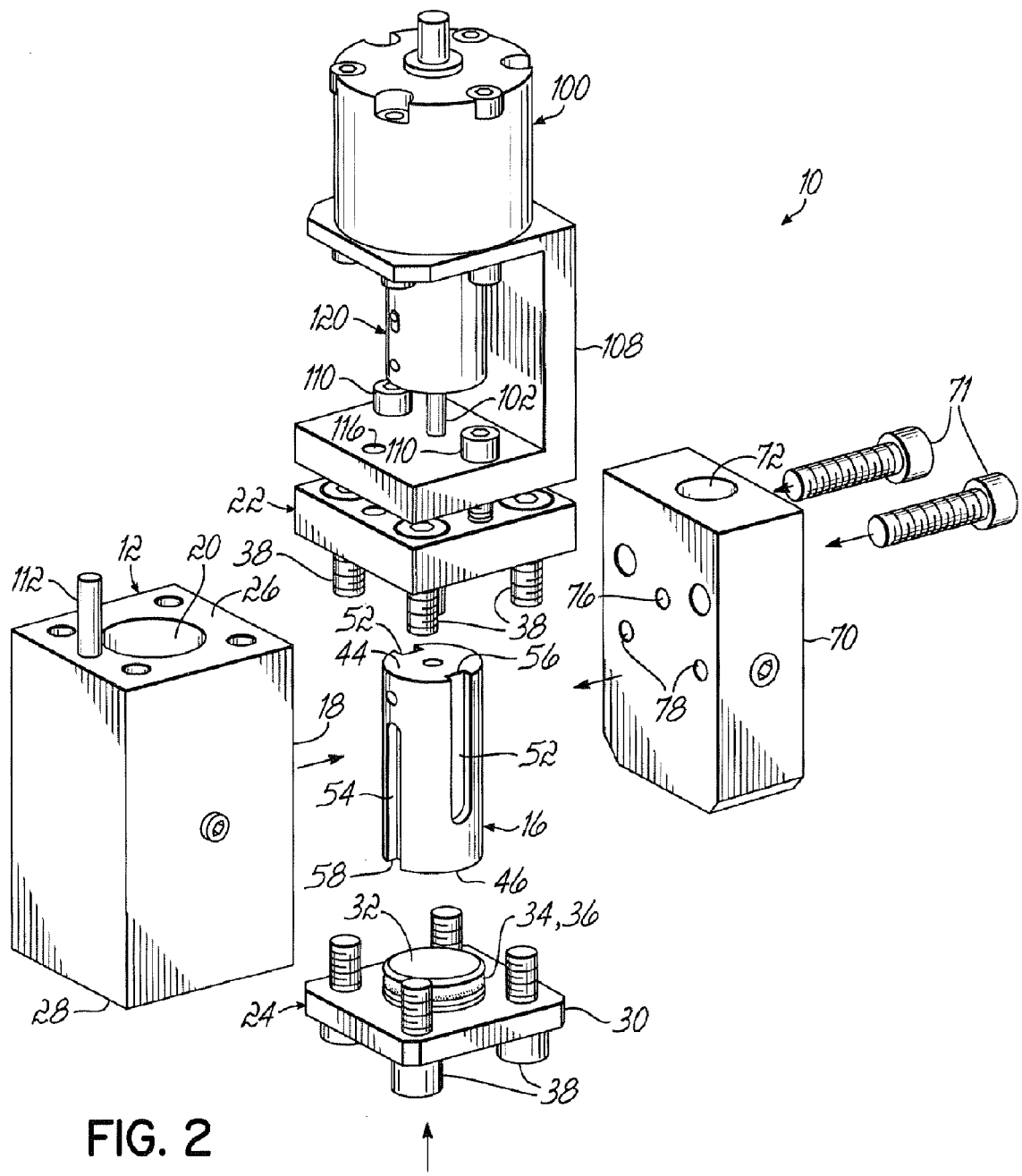
FIG. 2 is an exploded perspective view of the fluid metering system of FIG. 1.

FIGS. 1-4 depict an exemplary fluid metering system 10 according to the present invention. The fluid metering system 10 includes a piston housing 12 having a piston chamber 14 formed therein for receiving a piston 16. As best seen in FIG. 2, housing 12 of the embodiment shown comprises a housing body 18 having a central, elongate bore 20 formed therethrough to define the piston chamber 14. Various passages and fastener holes are also formed in the housing body 18, as will be described in more detail below.

The housing further includes upper and lower end caps 22, 24 which are attached to respective upper and lower ends 26, 28 of the housing body 18 to seal off the bore 20 defining the piston chamber 14. Each of the upper and lower end caps 22, 24 may comprise a generally flat plate 30 and a protruding central boss 32 sized to sealingly engage the ends of the piston bore 20. Accordingly, the end caps 22, 24 define first and second ends 31, 33 of the piston chamber 14. Circumferential grooves 34 formed around the protruding boss 32 receive O-rings 36 to seal the ends of the piston bore 20 when the end caps 22, 24 are secured thereto with fasteners 38.

Figure 3:
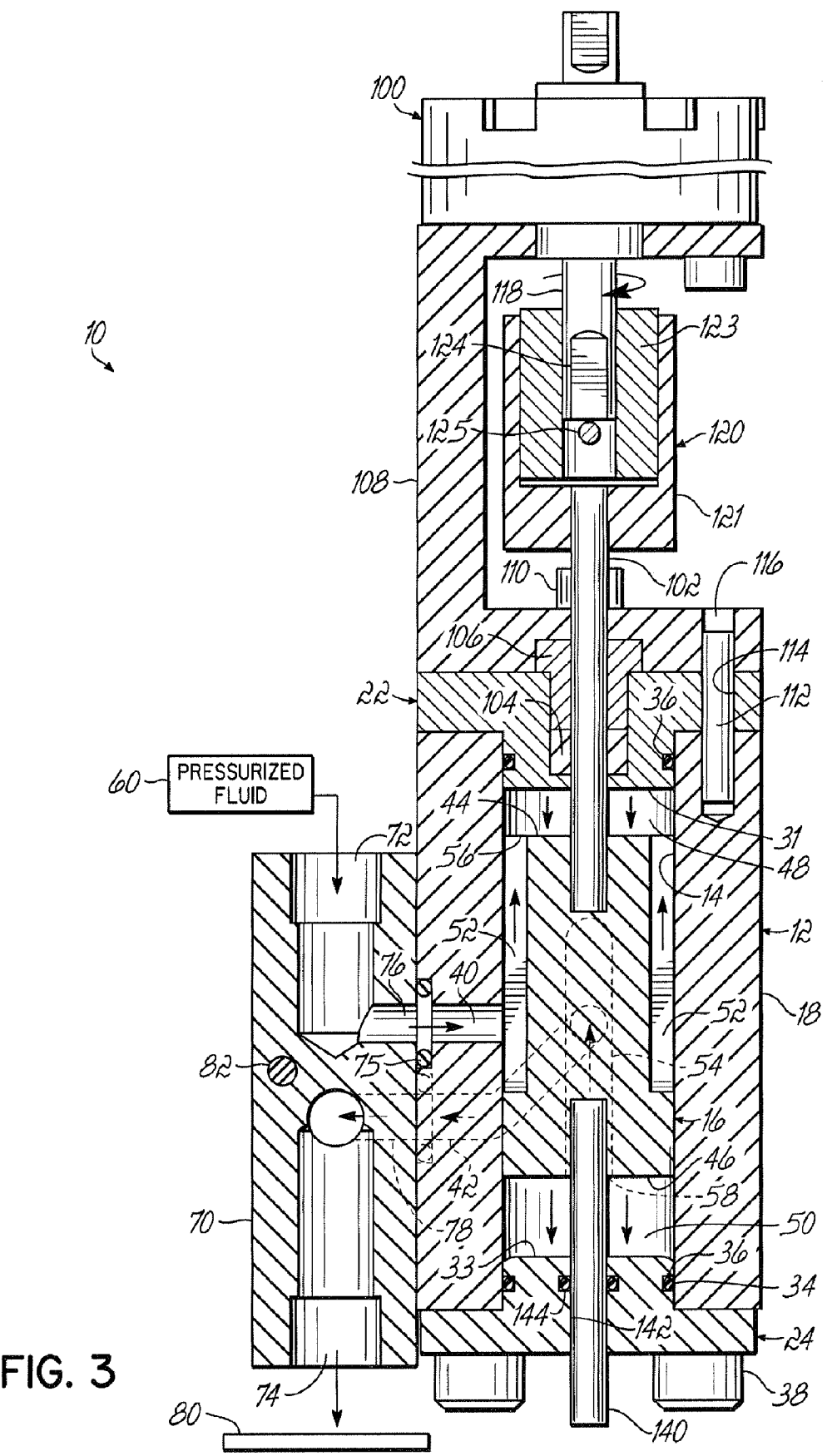
FIG. 3 is a cross-sectional view of the fluid metering system of FIG. 1, taken along line 3-3.
Figure 4:
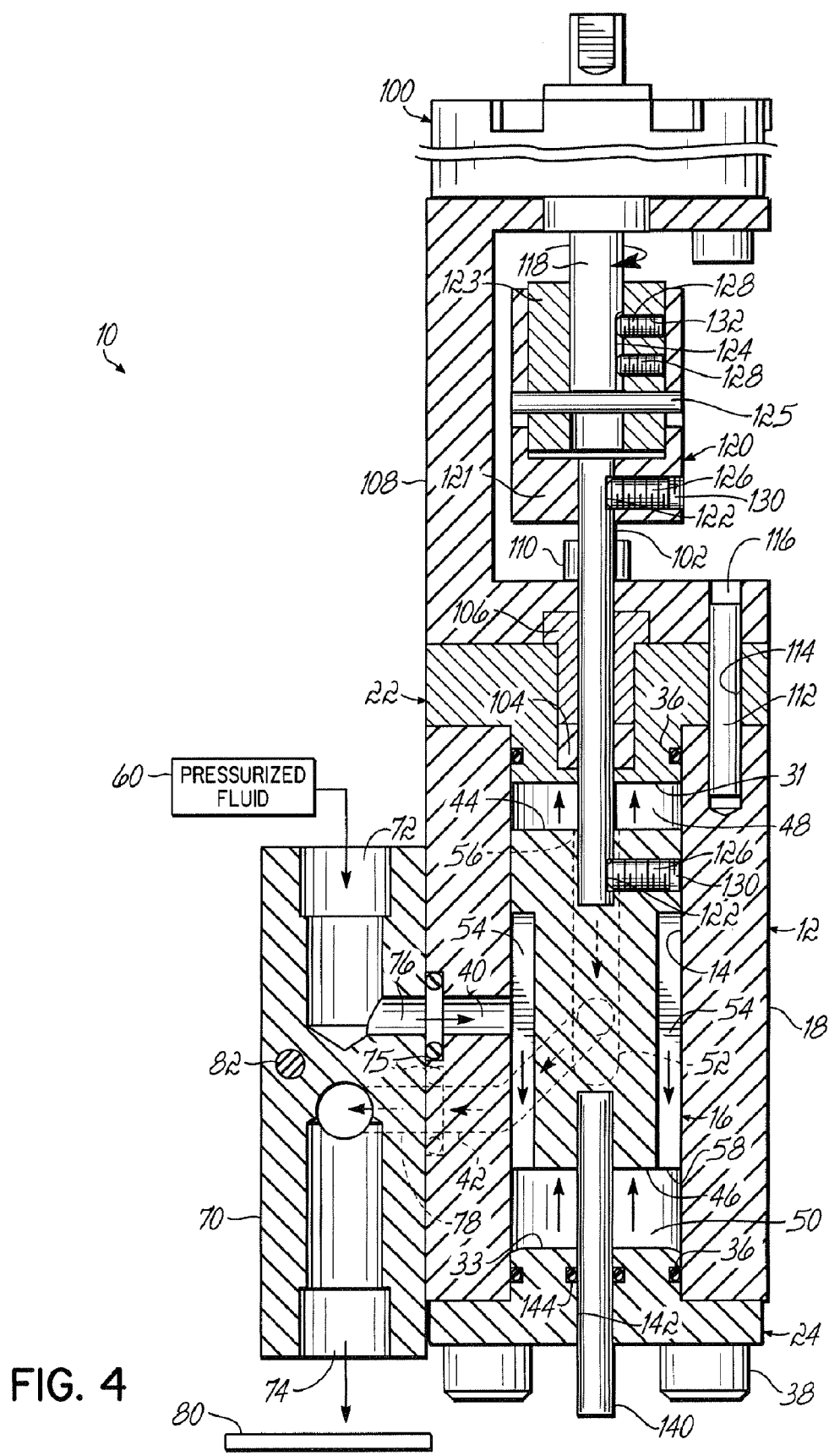
FIG. 4 is a cross-sectional view of the fluid metering system of FIG. 3, depicting the piston rotated to a different orientation.

Inlet and outlet passages 40, 42 are formed through the housing 12 and communicate with the piston chamber 14 (FIGS. 1, 3 and 4). In the embodiment shown, there is one inlet passage 40 and two outlet passages 42, and the inlet passage 40 is disposed about 90 degrees from each of the outlet passages 42, with respect to the circumference of the piston chamber 14.

An elongate piston 16 is slidably disposed within the piston chamber 14 for reciprocal movement therein. The piston 16 has first and second opposed ends 44, 46. As the piston 16 moves reciprocally between the first and seconds ends 31, 33 of the piston chamber 14, first and second volumes 48, 50 are defined adjacent the first and second ends 44, 46 of the piston 16, respectively. A series of longitudinally extending first and second slots, grooves, channels, etc., 52, 54 are formed into an outer surface of the piston 16. The first slots 52 have openings 56 at the first end 44 of the piston 16 for communication with the first volume 48, and extend from the first end 44 of the piston 16 toward the second end 46 of the piston 16. Similarly, the second slots 54 have openings 58 at the second end 46 of the piston 16 for communication with the second volume 50, and extend from the second end 46 of the piston 16 toward the first end 44 of the piston 16.

In the embodiment shown, the piston 16 has two first slots 52 and two second slots 54 formed into its outer surface. The slots 52, 54 are arranged around the circumference of the piston 16 such that the pairs of first and second slots 52, 54 are located opposite one another. Accordingly, the first slots 52 are disposed approximately 90 degrees from the second slots 54. It will be appreciated, however, that the piston 16 may alternatively have more than two first and second slots 52, 54, or only one of each of the first and second slots 52, 54. Moreover, the slots 52, 54 may be disposed around the circumference of the piston 16 in various other arrangements, but will generally be arranged in an alternating fashion.

The piston 16 is also rotatable about its longitudinal axis such that the first and second slots 52, 54 may be brought into registration with the inlet and outlet passages 40, 42. When one of the first slots 52 is aligned with the inlet passage 40, pressurized fluid from a source 60 flows through the inlet passage 40 and the first slot 52 to act on the piston 16 and cause it to move in a direction toward the second end 33 of the piston chamber 14. As the piston 16 moves toward the second end 33 of the piston chamber 14, the first volume 48 is filled with fluid. It will be recognized that the second volume 50 is caused to decrease as the piston 16 is moving toward the second end 33 of the piston chamber 14. Accordingly, any fluid, such as air or liquid material, residing in the second volume 50 will be dispensed from the second volume 50 through the outlet passage 42.

When the piston 16 reaches its limit of motion toward the second end 33 of the piston chamber 14, the piston 16 may be rotated to register one of the first slots 52 with the outlet passage 42, while simultaneously registering one of the second slots 54 with the inlet passage 40. Pressurized fluid from the source 60, now acts on the piston 16 through the second slot 54 and causes the piston 16 to move in a direction toward the first end 31 of the piston chamber 14. The second volume 50 now fills with fluid, while fluid in the first volume 48 is dispensed through the outlet passage 42, in a manner similar to that described above. The piston 16 may now be rotated to register one of the first slots 52 with the inlet passage 40, and one of the second slots 54 with the outlet passage 42 to again simultaneously dispense fluid from the second volume 50 while filling the first volume 48, as described above.

The process may be continuously repeated, as desired, to simultaneously fill and dispense fluid from the respective first and second volumes 48, 50 of the piston chamber 14. In this manner, precisely controlled volumes of fluid may be metered from the system 10, with one shot of metered fluid being dispensed per stroke of the piston 16, or, in other words, two shots per cycle. The dispensing system 10 of the present invention is therefore capable of higher dispense rates and effectively eliminates the dwell time between dispensed shots, compared to conventional dispensers.

The fluid metering system 10 shown further includes a fluid manifold 70 coupled to the piston housing 12, for example, by fasteners 71. The manifold 70 has inlet and outlet ports 72, 74 and associated passageways 76, 78 formed therein and configured to communicate respectively with the inlet and outlet passages 40, 42 of the housing 12. The joint between the inlet and outlet passages 40, 42 on the housing 12 and the inlet and outlet passageways 76, 78 on the manifold 70 may be sealed, for example, by O-rings 75. The inlet port 72 may be connected to the source of pressurized fluid 60, and the outlet port 74 may be fitted with a nozzle (not shown), as may be desired, to facilitate dispensing a desired shape or pattern of fluid material to a substrate 80, as known in the art. Furthermore, the manifold 70 may be provided with heating elements 82 to permit heating the fluid to a desired processing temperature, as known in the art.

In the embodiment shown, the fluid metering system 10 further includes a rotary actuator 100 coupled to the piston 16 to control the rotary motion of the piston 16 in the piston chamber 14. In this embodiment, a piston rod 102 extends from the first end 44 of the piston 16 and through the upper end cap 22 of the housing 12. The upper end cap 22 is provided with a shaft seal 104 and a bushing 106 to accommodate reciprocal movement of the piston rod 102 with the piston 16, while sealing the fluid within the piston chamber 14. The rotary actuator 100 is supported above the housing 12 by an actuator mounting bracket 108. The mounting bracket 108 is secured to the upper end cap 22 by fasteners 110. A mounting stud 112 may be provided in the upper end 26 of the housing body 18, and the upper end cap 22 and mounting bracket 108 may be provided with corresponding apertures 114, 116 to facilitate alignment of the components, as depicted in FIGS. 2-4.

An output shaft 118 of the rotary actuator 100 is aligned with the piston rod 102, and the piston rod 102 and output shaft 118 are coupled by a suitable coupling 120 such that the rotational motion of the output shaft 118 may be transferred to the piston rod 102. In the embodiment shown, the coupling 120 comprises a first coupling member 121 for attachment to the piston rod 102, and a second coupling member 123 for attachment to the output shaft 118. The second coupling member 123 is received within the first coupling member 121 and is secured to the first coupling member 121 by a pin 125.

In the embodiment shown, flat areas 122, 124 are formed on the confronting ends of the piston rod 102 and the output shaft 118 to permit the piston rod 102 and output shaft 118 to be joined to the coupling 120 by set screws 126, 128. The set screws 126, 128 are installed through corresponding threaded apertures 130, 132 formed in the coupling 120 to engage the respective flat portions of the piston rod and output shaft. A flat area 122 may also be formed on the opposite end of the piston rod 102 to permit the piston 16 to be joined to the piston rod 102 by a set screw 126. It will be recognized, however, that the piston rod 102 may alternatively be joined to the piston by screw threads, press fit, or any other method suitable for securing the piston rod 102 to the piston 16. The flat areas 122, 124 of the piston rod 102 and output shaft 118 may be utilized to facilitate aligning the output shaft 118, piston rod 102, and piston 16 such that the rotational movement imparted by the rotary actuator 100 properly aligns the first and second slots 52, 54 with the inlet and outlet passages 40, 42 formed through the piston housing 12.

The rotary actuator 100 may be any actuator suitable to rotate the piston 16 within the piston chamber 14 in a controlled manner. For example, the rotary actuator 100 may be a pneumatic rotary valve vane actuator, such as Model No. NCRB1 BW30-90S, available from SMC Corporation of America located in Indianapolis, Ind. This type of rotary actuator is configured to rotate through an angle of 90 degrees. Alternatively, a continuously rotatable actuator may be used, with a controller and appropriate feedback mechanisms to ensure proper rotation of the piston within the chamber. It will be recognized that various other devices for rotating the piston 16 may also be used, such as a Geneva wheel, a rack and pinion type rotary actuator, or any other actuator suitable for rotating the piston to selectively register the first and second slots 52, 54 with the inlet and outlet passages 40, 42.

In another embodiment, depicted in FIGS. 3 and 4, the fluid metering system 10 further includes a compensator rod 140 provided at the second end 46 of the piston 16. The compensator rod 140 compensates for the volume of fluid displaced by the piston rod 102 in the first volume 48 by displacing fluid in the second volume 50 such that the maximum values of the first and second volumes 48, 50 are substantially equal. In the embodiment shown in FIGS. 3 and 4, the compensator rod 140 is coupled to the second end 46 of the piston 16 and extends through an aperture 142 formed in the lower end cap 24 of the piston housing 12. Accordingly, the lower end cap 24 is provided with a shaft seal or O-ring 144 to accommodate movement of the compensator rod 140 while sealing the piston chamber 14.

Figure 5:
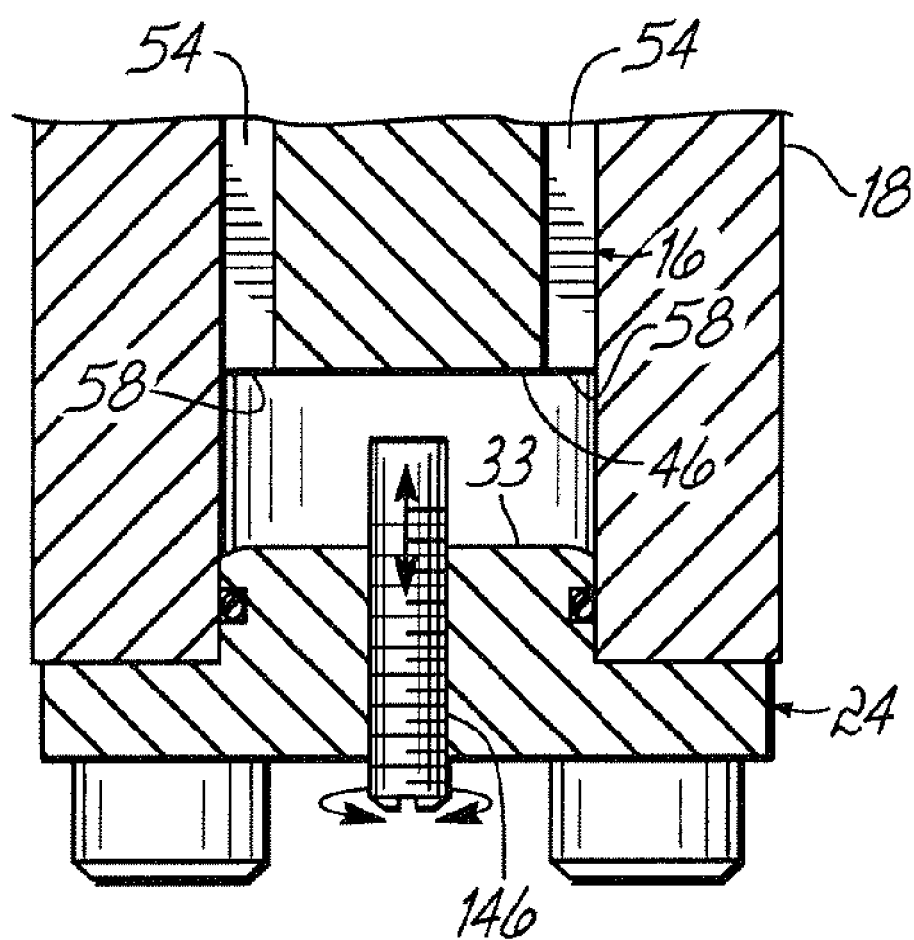
FIG. 5 is a partial cross-sectional view depicting another embodiment of a fluid metering system according to the invention.

In another embodiment, depicted in FIG. 5, a limit stop 146 extends through the second end 33 of the piston chamber 14 in a direction toward the second end 46 of the piston 16. In this embodiment, the length of the limit stop 146 extending into the piston chamber 14 is selectively adjustable so that the stroke of the piston 16 in the piston chamber 14 is limited between the first end 31 of the piston chamber and the limit stop 146. By adjusting the length of the limit stop 146 extending into the piston chamber 14, the stroke of the piston 16 within the piston chamber 14, and thus the amount of fluid dispensed through outlet passage 42, may thereby be selectively adjusted. In the embodiment shown, the limit stop 146 is in the form of a rod that is threadably coupled to the lower end cap 24 to permit selective adjustment of the limit stop 146. It will be recognized, however, that various other methods may be used to facilitate adjusting the length of the limit stop 146 within the piston chamber 14.

Operation of the fluid dispensing system 10 will now be described with particular reference to FIGS. 3 and 4. In FIG. 3, the fluid dispensing system 10 is depicted with the piston 16 oriented to register one of the first slots 52 with the inlet passage 40. As pressurized fluid from the source 60 enters the first slot 52 through the inlet passage 40, the fluid flows through the slot 52 and causes the piston 16 to move in a direction toward the second end 33 of the piston chamber 14. As the piston 16 moves toward the second end 33 of the piston chamber 14, the first volume 48 at the first end 31 of the piston chamber 14 increases, while the second volume 50 at the second end 33 of the piston chamber 14 decreases, due to the reciprocating motion of the piston 16. Accordingly, the incoming fluid fills the first volume 48 while air, liquid or other fluid material disposed in the second volume 50 is discharged through the second slot 54, which is in communication with the outlet passage 42. The fluid from the second volume 50 flows through the outlet passage 42 and through the outlet port 74 to be dispensed to a substrate 80.

When a desired amount of fluid has been dispensed from the second volume 50, typically at the end of the stroke of reciprocating movement, the rotary actuator 100 rotates the piston 16 in the piston chamber 14 to bring one of the second slots 54 in registration with the inlet passage 40, while simultaneously bringing one of the first slots 52 in registration with the outlet passage 42, as depicted in FIG. 4. In this orientation, pressurized fluid acts on the piston 16 through the inlet passage 40 and the second slot 54 to cause the piston 16 to move toward the first end 31 of the piston chamber 14. As the piston 16 reciprocates toward the first end 31 of the piston chamber 14, the second volume 50 fills with fluid while the first volume 48 is decreased to dispense fluid through the first slot 52, through the outlet passage 42, and through the outlet port 74 to a substrate. When a desired amount of fluid has been dispensed from the first volume 48, the piston 16 may again be rotated by the rotary actuator 100 to register the first and second slots 52, 54 with the inlet and outlet passages 40, 42, respectively, and the entire process mat be repeated as described above so that fluid is dispensed from the outlet port 74 during each stroke of the piston 16.

In another embodiment of the invention, two or more fluid metering systems 10 may be used in conjunction to dispense precise, controlled volumes of different types of fluids for subsequent mixing. Such an embodiment is useful for dispensing multi-component adhesive, for example, where precise metering of the components is desired for proper mixing. The inlet passages 40 of the individual metering systems 10 may be coupled to sources 60 of the respective fluids. The outlet passages 42 may be coupled to individual dispensing heads for mixing outside the system, or may be joined by a common manifold configured to mix the fluids dispensed through the respective outlet passages directly therein.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. The various aspects of this invention may be used alone or in numerous combinations. Accordingly, departures may be made from such details without departing from the scope or spirit of Applicant's general inventive concept.

What is claimed is:

1. A fluid metering system, comprising:
   a housing including a piston chamber with first and second spaced ends, at least one housing inlet passage, and at least one housing outlet passage, said housing inlet and outlet passages communicating with said piston chamber;
   a piston in said piston chamber, said piston having first and second ends and an outer surface;
   said piston reciprocally movable within said piston chamber, between said first and second ends of said piston chamber, to alternatingly define first and second volumes within said piston chamber adjacent said first and second ends of said piston, respectively;
   at least one longitudinally extending first slot formed on said outer surface of said piston and extending from said first end of said piston toward said second end of said piston, said first slot having an opening at said first end of said piston in communication with said first volume;
   at least one longitudinally extending second slot formed on said outer surface of said piston and extending from said second end of said piston toward said first end of said piston, said second slot having an opening at said second end of said piston in communication with said second volume;
   said piston rotatable within said piston chamber to alternatingly bring one of said first and second slots in registration with said housing inlet passage, and to simultaneously bring the other of said first and second slots in registration with said housing outlet passage, whereby fluid is dispensed from one of said first and second volumes of said piston chamber through said housing outlet passage as said piston moves toward the other of said first and second ends of said piston chamber;
   a rotary actuator operatively coupled to said piston and configured to rotate said piston to alternatingly register one of said first and second slots with said housing inlet passage, while simultaneously registering the other of said first and second slots with said housing outlet passage;
   a piston rod extending from said first end of said piston, said piston coupled to said rotary actuator by said piston rod; and
   a compensator rod extending from said second end of said piston, said compensator rod sized to have substantially the same volume as said piston rod such that the maximum values of said first and second volumes are substantially equal;
   wherein said housing inlet passage is adapted to be in communication with a source of pressurized fluid and said piston is actuated for reciprocating movement within said piston chamber by said pressurized fluid acting on said piston through one of said first and second slots when said slot is in registration with said housing inlet passage.

2. The system of claim 1, further comprising a limit stop extending into said piston chamber and toward said piston, said limit stop having a selectively adjustable length that facilitates adjusting the volume of fluid dispensed by the system by limiting the reciprocating movement of said piston within said piston chamber.

3. The system of claim 1, comprising two first slots and two second slots, each pair of said first slots and said seconds slots located on diametrically opposed sides of said piston.

4. The system of claim 1, comprising a plurality of first slots and a plurality of second slots formed in said piston, said first and second slots arranged in an alternating pattern around a periphery of said piston.

5. The system of claim 1, wherein one of said first and second volumes is filled with fluid through said housing inlet passage while fluid is discharged from the other of said first and second volumes through said housing outlet passage by reciprocating movement of said piston.

6. A method for dispensing fluid from a fluid dispensing system including a piston chamber, inlet and outlet passages communicating with the piston chamber, and a piston disposed in the piston chamber for reciprocating movement therein to alternatingly define first and second volumes in the piston chamber, the method comprising:
   providing pressurized fluid through the inlet passage to thereby reciprocate the piston in a first direction and to fill the first volume with fluid;
   rotating the piston to place the first volume in communication with the outlet passage and to place the second volume in communication with the inlet passage;
   providing pressurized fluid through the inlet passage to thereby reciprocate the piston in a second direction and to dispense fluid from the first volume through the outlet, while simultaneously filling the second volume with fluid through the inlet; and
   compensating for any difference between the first and second volumes such that the maximum values of the first and second volumes are substantially equal.

7. The method of claim 6, wherein rotating the piston comprises rotating the piston about an axis parallel to the first and second directions of movement of the piston.

8. The method of claim 6, wherein reciprocating the piston in the first direction simultaneously dispenses fluid from the second volume through the outlet passage.

9. The method of claim 6, further comprising:
   rotating the piston to place the second volume in communication with the outlet passage, and to place the first volume in communication with the inlet passage; and
   reciprocating the piston in the first direction to dispense fluid from the second volume through the outlet passage, while simultaneously filling the first volume with fluid through the inlet passage.

10. The method of claim 6, wherein the piston is rotated at the end of each stroke of reciprocal movement of the piston.

11. A fluid metering system, comprising:
    a housing including a piston chamber with first and second spaced ends, at least one housing inlet passage, and at least one housing outlet passage, said housing inlet and outlet passages communicating with said piston chamber;
    a piston, reciprocally movable within said piston chamber between said first and second ends of said piston chamber to define first and second volumes within said piston chamber, said piston further mounted for rotational movement from a first position to a second position within said piston chamber;
    said piston fluidly coupling said housing inlet passage and said first volume within said piston chamber while also fluidly coupling said housing outlet passage and said second volume within said piston chamber, when said piston is in said first position;

said piston fluidly coupling said housing inlet passage and said second volume within said piston chamber while also fluidly coupling said housing outlet passage and said first volume within said piston chamber, when said piston is in said second position;

a rotary actuator operatively coupled to said piston and configured to rotate said piston to alternatingly register one of said first and second slots with said housing inlet passage, while simultaneously registering the other of said first and second slots with said housing outlet passage;

a piston rod extending from said first end of said piston, said piston coupled to said rotary actuator by said piston rod; and a compensator rod extending from said second end of said piston, said compensator rod sized to have substantially the same volume as said piston rod such that the maximum values of said first and second volumes are substantially equal;

wherein said housing inlet passage is adapted to be in communication with a source of pressurized fluid and said piston is actuated for reciprocating movement within said piston chamber by said pressurized fluid acting on said piston from one of said first and second volumes within said piston chamber fluidly coupled with said housing inlet passage.

12. The system of claim 11, further comprising a limit stop extending into said piston chamber and toward said piston, said limit stop having a selectively adjustable length that facilitates adjusting the volume of fluid dispensed by the system by limiting the reciprocating movement of said piston within said piston chamber.

* * * * *

UNITED STATES PATENT AND TRADEMARK OFFICE
CERTIFICATE OF CORRECTION

PATENT NO. : 7,384,249 B2  
APPLICATION NO. : 10/906640  
DATED : June 10, 2008  
INVENTOR(S) : Mario Romanin Page 1 of 1

It is certified that error appears in the above-identified patent and that said Letters Patent is hereby corrected as shown below:

Column 1

Line 11, change "discreet" to --discrete--.

Line 14, change "discreet" to --discrete--.

Column 6

Line 17, change "mat" to --may--.

Column 8

Claim 3, line 2, change "seconds" to --second--.

Signed and Sealed this

Twenty-first Day of April, 2009

JOHN DOLL  
*Acting Director of the United States Patent and Trademark Office*

UNITED STATES PATENT AND TRADEMARK OFFICE
CERTIFICATE OF CORRECTION

PATENT NO. : 7,384,249 B2  
APPLICATION NO. : 10/906640  
DATED : June 10, 2008  
INVENTOR(S) : Mario Romanin Page 1 of 1

It is certified that error appears in the above-identified patent and that said Letters Patent is hereby corrected as shown below:

Column 1

Line 11, change "discreet" to --discrete--.

Line 14, change "discreet" to --discrete--.

Column 6

Line 17, change "mat" to --may--.

Column 8

Claim 3, line 5, change "seconds" to --second--.

This certificate supersedes the Certificate of Correction issued April 21, 2009.

Signed and Sealed this

Twelfth Day of May, 2009

JOHN DOLL  
*Acting Director of the United States Patent and Trademark Office*